Nov. 17, 1953
C. E. DRAKE
2,659,397
CARBIDE TIPPED PLANER SAW
Filed Dec. 23, 1948
2 Sheets-Sheet 1
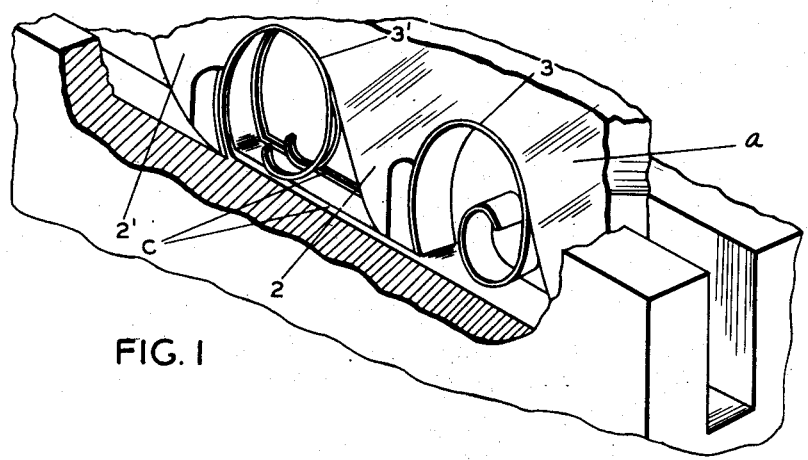
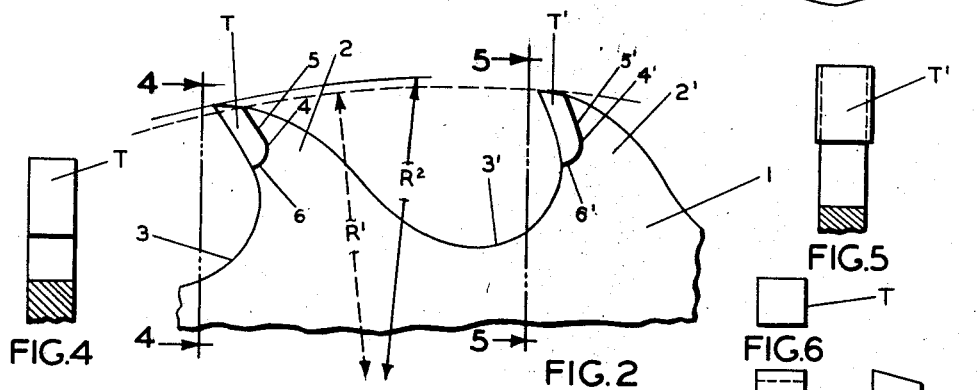
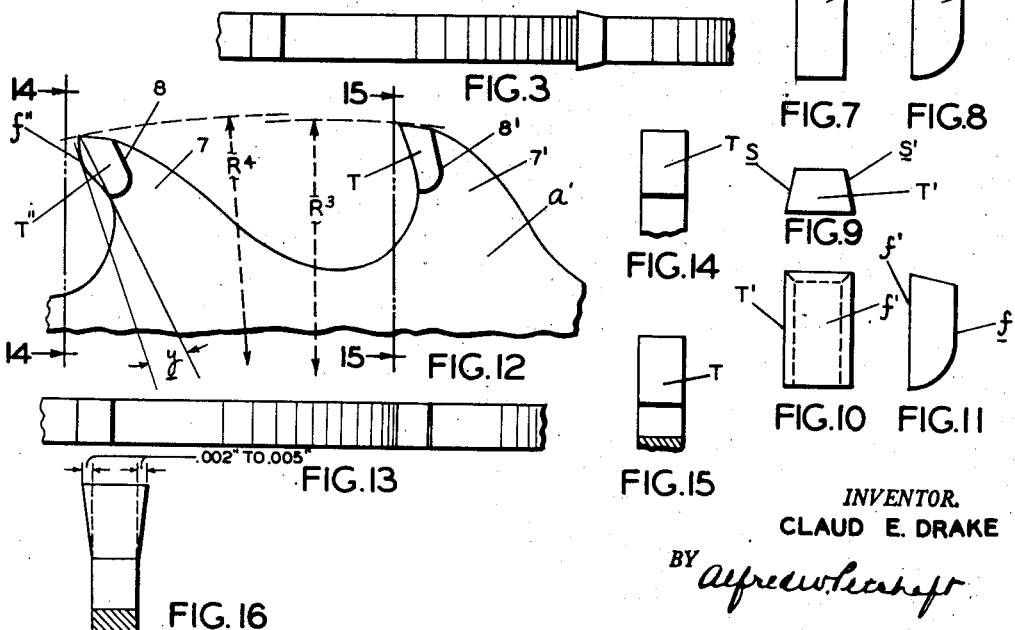
INVENTOR.
CLAUD E. DRAKE
BY *Alfred W. Pechapt*
ATTORNEY Nov. 17, 1953  C. E. DRAKE  2,659,397
CARBIDE TIPPED PLANER SAW
Filed Dec. 23, 1948  2 Sheets-Sheet 2

INVENTOR.
CLAUD E. DRAKE
BY *Alfred W. Petchaft*
ATTORNEY

Patented Nov. 17, 1953

2,659,397

UNITED STATES PATENT OFFICE 2,659,397

CARBIDE TIPPED PLANER SAW

Claud E. Drake, Brentwood, Mo.

Application December 23, 1948, Serial No. 66,926

5 Claims. (Cl. 143—140)

This invention relates in general to certain new and useful improvements in saws and cutters, such as saws and the like, and, more particularly, to carbide tipped circular cutters and saws.

It is the primary object of the present invention to provide a toothed cutter or saw which is economical in construction and cost of operation and is capable of performing highly accurate work at a sustained rate and over a long period of time without shutdowns for repairs or resharpening.

It is another object of the present invention to provide a cutting tool of the type stated which will form extremely smooth, cleanly cut kerfs and is adapted for cutting a wide range of materials.

It is also an object of the present invention to provide a cutting tool of the type stated which will produce cleanly sheared chips and will be capable of operating at faster peripheral speeds and faster rates of in-feed than conventional types of cutters and will produce work of extremely close tolerance and smooth finish thereby eliminating the extra cost of subsequent finishing operations.

It is similarly an object of the present invention to provide a carbide tip cutter of the type stated in which the tooth design is of such contour and shape as to strengthen the tooth at the tip and support the carbide insert in such a manner as to strengthen the tooth and enable it to withstand relatively high impact forces without breakage.

It is a further object of the present invention to provide a cutter of the type stated which is adapted to break up the chip and lessen or decrease the forces or stress to which each tooth is subjected at instant of impact and to prevent accumulation of gum deposits.

It is an additional object of my invention to provide a cutter of the type stated which utilizes a unique grouping of sets of cutting teeth of varied length and width to progressively deepen and widen the kerf or saw cut dividing chip removal into two or more junctions in a plane at a right angle to the plane of the saw.

With the above and other objects in view, my invention resides in the novel features of form, construction, arrangement, and combination of parts presently described and pointed out in the claims.

In the accompanying drawings—

Figure 1 is a fragmentary perspective view, partly broken away and in section, of a saw constructed in accordance with the present invention, illustrating the manner of chip formation as the teeth move through the kerf;

Figure 2 is a fragmentary side elevational view of a circular saw or cutter constructed in accordance with the present invention;

Figure 3 is a fragmentary top plan view of the circular cutter or saw;

Figure 17:
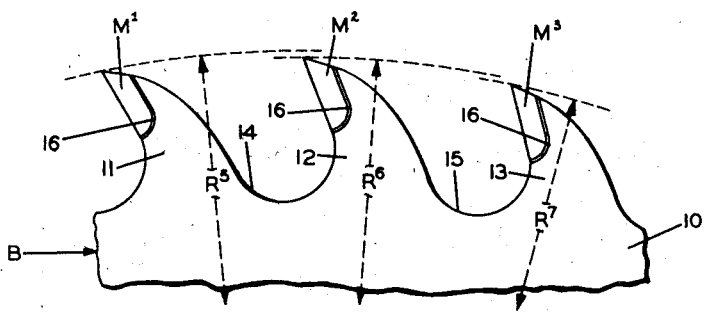
Figure 19:
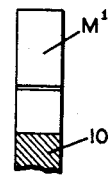
Figure 18:
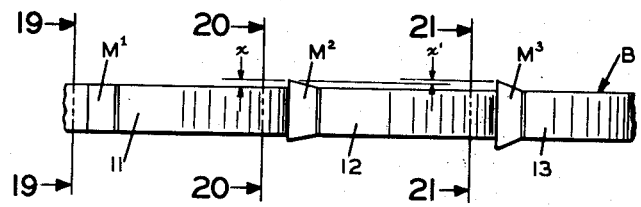
Figure 20:
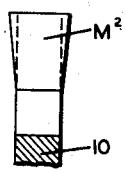
Figure 22:
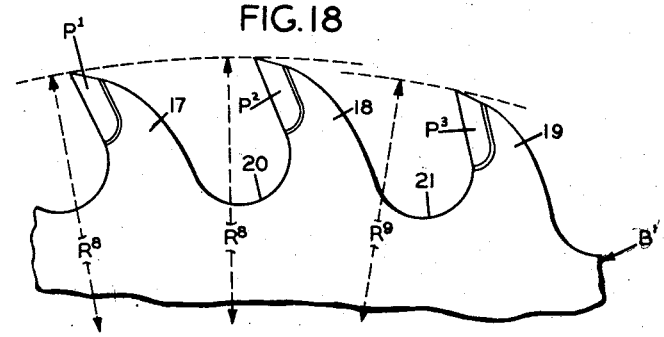
Figure 21:
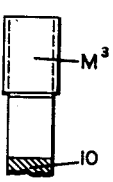
Figure 23:
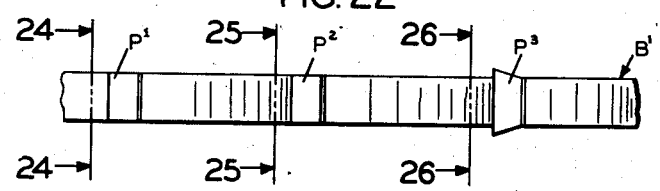

Figures 4 and 5 are fragmentary cross-sectional views of the saw taken, respectively, along the lines 4—4 and 5—5 of Figure 2;

Figures 6, 7, and 8 are top plan, front elevational, and side elevational views, respectively, of one form of carbide tip forming a part of the present invention;

Figures 9, 10, and 11 are top plan, front elevational, and side elevational views, respectively, of another form of carbide tip forming a part of the present invention;

Figure 12 is a fragmentary side elevational view of a modified form of circular cutter or saw constructed in accordance with and embodying the present invention;

Figure 13 is a fragmentary top plan view of the modified form of circular cutter or saw;

Figures 14 and 15 are fragmentary sectional views of the modified form of circular cutter or saw taken, respectively, along the lines 14—14 and 15—15, respectively of Figure 12;

Figure 16 is a front elevational view of a tooth tip illustrating a modified method of grinding the tooth to provide radial side clearance;

Figure 17 is a fragmentary side elevational view of a further modified form of circular cutter;

Figure 18 is top plan view of the cutter shown in Figure 17;

Figures 19, 20, 21 are fragmentary sectional views taken along lines 19—19, 20—20, and 21—21 of Figure 18 respectively;

Figure 22 is a fragmentary side elevational view of a further modified form of circular cutter;

Figure 23 is top plan view of the cutter shown in Figure 17; and

Figure 24:
Figure 25:
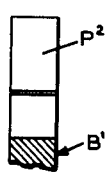
Figure 26:
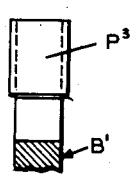

Figures 24, 25, 26 are fragmentary sectional views taken along lines 24—24, 25—25, and 26—26 of Figure 23 respectively.

Referring now in more detail and by reference characters to the drawing, which illustrates practical embodiments of the present invention, A designates a circular cutter or saw comprising a steel disk or plate 1, which may be of any suitable gauge, thickness, and diameter and which is formed of any conventional steel alloy ordinarily used for such purposes. The disk or plate 1 is provided around its periphery with a uniformly spaced annular series of pairs of teeth 2, 2', separated by gullets 3, 3'. Each tooth 2 is cut away inwardly from its point in the provision of a two-sided recess 4 having a flat backing face 5 perpendicular to the side faces of the plate 1 and an arcuate bottom face 6, so that the backing face 5 may be said to be connected to the toothface by a "radius," as it is sometimes called. Similarly, each tooth 2' is cut away inwardly from its point in the provision of a two-sided recess 4' having a flat backing face 5' perpendicular to the side faces of the plate 1 and an arcuate bottom face 6'.

Provided for disposition in the recesses 4 of the teeth 2 are tungsten carbide or alloy tip members T, each of which, as shown in Figures 6, 7, and 8, is formed of compressed and sintered carbide or suitable dense cast alloys in the shape of an elongated prism having a transverse width substantially equal to the thickness of the plate 1 and having a radius equal to the radius of the bottom face 6 of the recess 4. The tip T is furthermore slightly wider and greater in length than the recess and is tightly and securely brazed or silver-soldered into the recess 4 with its side faces flush with the side faces of the plate 1.

Similarly provided for disposition in the recesses 4' of the teeth 2' are carbide tip members T', each of which, as shown in Figures 9, 10, and 11, is formed of compressed and sintered tungsten carbide or dense cast alloy in the shape of a somewhat prism-shaped solid having a transverse cross-sectional shape, as shown in Figure 11, identical with the cross-sectional shape of the tip member T and being on it rear face $f$ substantially identical in shape and size to the backing face 5' of the recess 4'. On its forwardly or outwardly presented face $f'$, the tip member T is symmetrically widened, so that its side faces $s$, $s'$, will, in a manner of speaking, be uniformly outwardly beveled, all as best seen in Figure 9. The tip T' is also firmly brazed or silver-soldered into one of the recesses 4'.

The teeth 2, 2', are then ground so that the faces and lands of the tips T, T', are brought into smoothly curved conformity with the tooth pattern, as shown in Figure 2. It should be noted in this connection that the teeth 2 and 2' are respectively arranged in recurring or alternate sequence around the periphery of the cutter or saw A and that the teeth 2 are high teeth in the sense that the radial distance R' from the center of the plate 1 to the outermost point of the tip T' is somewhat shorter than the radial distance $R^2$ from the center of the plate 1 to the outermost point of the tip T. It will also be noted that the low teeth 2' are also the wide teeth and may be referred to as the planing teeth, whereas the high teeth 2 are narrow teeth and may be referred to as "hogging" teeth. The tip cutting the center ship may have a transverse thickness only about fifty percent of that of the low tooth, so that the chip or stock removal will be equally divided between the high-low teeth. As shown in Figure 1, the high or hogging teeth 2 serve to remove fifty percent or more of the material from the kerf and, because they are narrower than the kerf which is being cut, this bulk removal chip will not be bound at its edges but will curl up freely in the gullet 3 and spring out radially as the tooth leaves the work. The remaining material in the kerf will trail behind the high or hogging teeth 2, as shown at $c$ in Figure 1, and will be removed sharply and cleanly by the planing tooth 2' which follows in successive order after the hogging tooth 2. The material removed by the planing teeth 2' will curl up in two unimpeded spirals within the gullet 3', so that the side faces of the kerf will be clean, sharp, and smooth. The difference in radial length of the high-low teeth is varied with the rate of feed, thickness of material, saw speed and tooth pitch, so that, under any given set of above factors, the chip loading of the teeth will not be so great that a low tooth can cut a chip all the way transversely across its edge.

For certain types of materials of loosely fibrous character, it has been found preferable to employ a modified form of cutter or circular saw A', which is substantially similar to the previously described cutter A, having high teeth 7 and low teeth 7' respectively provided with recesses 8, 8'. Brazed into the recess 8' is a carbide tip member T, substantially identical with the tip member T of the previously described cutter or saw A. In the recess 8, however, there is brazed a carbide tip member T'', which is substantially the width as the thickness of the plate 1 and is formed with a forward face $f''$ of outwardly curving or convex contour, as shown in Figure 12, the degree of convexity being represented by the angle $y$, that is to say, an angle between the radial line extending from the outer point of the tip T'' to the center of the saw blade A' and a line tangential to the curve of the face $f''$ at the outermost or tip point thereof. This angle $y$ is, in effect, a negative rake angle and strengthens the cutting edge of the tip and facilitates smooth cutting.

If desired, the high teeth, such as the teeth T', T'', may be ground for radial clearance, as shown in Figure 16, to facilitate free feeding of the tooth into the work.

If desired, it is also possible to provide a modified form of tooth cutter B comprising a steel disk or plate 10 which may be of any suitable gauge, thickness, or diameter and, like the embodiments previously described, is formed of any conventional steel alloy. The disk or plate 10 is provided around its periphery with uniformly spaced annular sets of three teeth 11, 12, 13, separated by gullets 14, 15. For convenience, the teeth 11, 12, 13, in each set may be respectively referred to as the leading tooth, the intermediate tooth, and the trailing tooth. Each of the teeth 11, 12, 13, is provided with an arcuate bottom recess 15 substantially identical with the recess 4 of the previously described saw A. Brazed or otherwise suitably secured in the recesses 16 of the teeth 11, 12, 13, respectively, are tips $M^1$, $M^2$, $M^3$, formed preferably of sintered tungsten carbide or a dense cast alloy. The tip $M^1$ is ground on its exposed faces to conform to the arcuate contour or profile of the tooth in such a manner that its side faces are flush with the side faces of the blade 10 and its tip or cutting edge is disposed outwardly in the center of the saw on a radius $R^5$ all as best seen in Figures 17 and 19. The tip $M^2$ is ground to conform to the profile of the tooth 12 and is substantially wider at its cutting edge than the blade 10, tapering rearwardly and downwardly to provide both radial and side clearances, as shown in Figure 20. The tooth $M^2$, furthermore, has its cutting edge located at a radial distance $R^6$ from the center of the blade 10. The radial distance $R^6$ is somewhat shorter than the radial distance $R^5$.

Finally, the tip $M^3$ is also ground to conform to the profile to the tooth 13 but is substantially wider on its cutting face than the thickness of the blade and is parallel sided along the radial edges of its cutting face, as shown in Figure 21, so as to function as a planer tooth to smooth the side faces as well as the bottom of the kerf. The tip $M^3$ is, furthermore, ground angularly backwardly to provide side clearances somewhat wider along its cutting face than the width of the cutting edge of the preceding tooth $M^2$, all as best seen in Figure 18.

Additionally, the cutting edge of the tooth $M^3$ is located at a radial distance $R^7$ from the center of the blade 10. The distance $R^7$ being somewhat shorter than the radial distance $R^6$ of the cutting edge of the preceding tooth tip $M^2$.

It has also been found possible to provide another further modified form of saw B' as shown in Figure 22, which has provided around its periphery annularly spaced series of sets of three teeth 17, 18, 19, separated by gullets 20, 21, and provided with tips with tungsten carbide or dense cast alloy tips $P^1$, $P^2$, $P^3$, respectively. In this particular modification the teeth 17, 18, and the tips $P^1$, $p^2$, thereof, are identical in every respect and have their cutting edges located at the same radial distance $R^8$ from the center of the blade B'. The tip $P^3$ is substantially wider than the preceding tips $p^1$, $p^2$, and has a cutting face in which the side or radial edges are parallel with its side faces, being inwardly ground to provide side clearance, all as best seen in Figures 23 and 26. Such an arrangement of teeth divides the primary chip removal load equally between the two leading teeth 17, 18. The tip $P^3$ of the rear or trailing tooth 19, on the other hand, has its cutting edge located at a radial distance $R^9$ from the center of the blade 10, such radial distance $R^9$ being substantially shorter than the radial distance $R^8$ so that the tip $P^3$ will perform a planing function and smooth the side walls of the kerf.

It should be understood that although, for purposes of illustration, reference has been specifically made to circular cutters, the present invention can be equally well applied to straight saws, such as power hack saw blades, broaches, and the like, and that modifications in the form, construction, arrangement, and combination of the several parts of toothed cutters may be made and substituted for those herein shown and described without departing from the nature and principle of my invention.

Having thus described my invention, what I claim and desire to secure by Letters Patent is:

1. A circular cutter having oppositely presented flat parallel lateral faces and being provided with a plurality of spaced teeth around its periphery, each tooth having an insert carbide tip, said teeth being arranged in sets, each set consisting of at least a leading tooth and a trailing tooth, said leading tooth in each set having greater radial height than the trailing tooth and also having forwardly presented parallel gullet-defining edges which are flush with the lateral faces of the cutter, and said trailing tooth having forwardly presented gullet-defining edges which are parallel to and spaced outwardly from the lateral faces of the cutter.

2. A circular cutter having oppositely presented flat parallel lateral faces and being provided with a plurality of spaced teeth around its periphery, each tooth having an insert carbide tip, said teeth being arranged in sets of three, each set consisting of a leading tooth, an intermediate tooth and a trailing tooth, said leading tooth in each set having greater radial height than the trailing tooth and also having forwardly presented parallel gullet-defining edges which are flush with the lateral faces of the cutter, said intermediate tooth being identical with the leading tooth and said trailing tooth having forwardly presented gullet-defining edges which are parallel to and spaced outwardly from the lateral faces of the cutter.

3. A circular cutter having oppositely presented flat parallel lateral faces and being provided with a plurality of spaced teeth around its periphery, each tooth having an insert carbide tip, said teeth being arranged in sets of three, each set consisting of a leading tooth, an intermediate tooth and a trailing tooth, said leading tooth in each set having greater radial height than the trailing tooth and also having forwardly presented parallel gullet-defining edges which are flush with the lateral faces of the cutter, the intermediate tooth of such set having a radial height greater than the radial height of the trailing tooth and shorter than the radial height of the leading tooth and said trailing tooth having forwardly presented gullet-defining edges which are parallel to and spaced outwardly from the lateral faces of the cutter.

4. A circular cutter having oppositely presented flat parallel lateral faces and being provided with a plurality of spaced teeth around its periphery, each tooth having an insert carbide tip, said teeth being arranged in sets of three, each set consisting of a leading tooth, an intermediate tooth and a trailing tooth, said leading tooth in each in each set having greater radial height than the trailing tooth and also having forwardly presented parallel gullet-defining edges which are flush with the lateral faces of the cutter, the intermediate tooth of such set having a radial height greater than the radial height of the trailing tooth and shorter than the radial height of the leading tooth, said intermediate tooth furthermore having at its cutting edge a transverse width greater than that of the leading tooth and narrower than that of the trailing tooth and said trailing tooth having forwardly presented gullet-defining edges which are parallel to and spaced outwardly from the lateral faces of the cutter.

5. A circular cutter having oppositely presented flat parallel lateral faces and being provided around its periphery with a plurality of uniformly spaced carbide-tipped teeth separated by gullets, said teeth being arranged in pairs with the carbide tips having gullet-faces contoured to the shape of the gullet, one tooth in each pair having a greater radial height than the other tooth in said pair and having opposite parallel edges defining the radial margins of its gullet-face, said edges being flush with the lateral faces of the cutter and said low tooth having a substantially greater transverse width than the high tooth and having opposite parallel edges defining the radial margins of its gullet-face, said edges being parallel to and spaced outwardly from the lateral faces of the cutter.

CLAUD E. DRAKE.

References Cited in the file of this patent

UNITED STATES PATENTS

| Number | Name | Date |
|---|---|---|
| 105,261 | Shailer | July 12, 1870 |
| 543,608 | Beale | July 30, 1895 |
| 1,716,976 | Prentice | June 11, 1929 |
| 1,771,722 | Prentice | July 29, 1930 |
| 1,837,344 | Stauder | Dec. 22, 1931 |
| 1,861,218 | Huther | May 31, 1932 |
| 2,126,382 | Goff et al. | Aug. 9, 1938 |
| 2,259,015 | Anderson | Oct. 14, 1941 |

FOREIGN PATENTS

| Number | Country | Date |
|---|---|---|
| 426,498 | Great Britain | Apr. 4, 1935 |
| 537,764 | Great Britain | July 4, 1941 |
| 617,615 | Germany | Aug. 22, 1935 |